(12) United States Patent
Morwing et al.

(10) Patent No.: US 11,106,905 B2
(45) Date of Patent: Aug. 31, 2021

(54) MULTI-CHARACTER TEXT INPUT SYSTEM WITH AUDIO FEEDBACK AND WORD COMPLETION

(71) Applicant: Cerence Operating Company, Burlington, MA (US)

(72) Inventors: Jonas Morwing, Lund (SE); Christer Friberg, Lund (SE); Jakob Sternby, Lund (SE); Jonas Andersson, Malmo (SE)

(73) Assignee: Cerence Operating Company, Burlington, MA (US)

( * ) Notice: Subject to any disclaimer, the term of this patent is extended or adjusted under 35 U.S.C. 154(b) by 139 days.

(21) Appl. No.: 16/120,774

(22) Filed: Sep. 4, 2018

(65) Prior Publication Data

US 2020/0074167 A1     Mar. 5, 2020

(51) Int. Cl.
*G06F 3/0488* (2013.01)
*G06F 3/16* (2006.01)
*G06F 40/274* (2020.01)
*G06K 9/00* (2006.01)
*G06K 9/22* (2006.01)
(Continued)

(52) U.S. Cl.
CPC ......... *G06K 9/00409* (2013.01); *G06F 3/167* (2013.01); *G06F 40/205* (2020.01); *G06F 40/289* (2020.01); *G06K 9/222* (2013.01); *G10L 13/08* (2013.01); *G06K 9/00402* (2013.01)

(58) Field of Classification Search
CPC .... G06F 3/0237; G06F 3/04883; G06F 3/167; G06F 17/2705; G06F 17/2775; G06F 40/205; G06F 40/274; G06F 40/289; G06K 9/004; G06K 9/00402; G06K 9/00409; G06K 9/222; G10L 13/08
See application file for complete search history.

(56) References Cited

U.S. PATENT DOCUMENTS 6,005,973 A *  12/1999  Seybold ............. G06K 9/00872
                                                382/187
6,415,256 B1 *  7/2002  Ditzik ................... G06F 3/0488
                                                345/169

(Continued)

FOREIGN PATENT DOCUMENTS

WO     2014051929 A1    4/2014
WO     2018027137 A1    2/2018

*Primary Examiner* — Yubin Hung
(74) *Attorney, Agent, or Firm* — Occhiuti & Rohlicek LLP (57) ABSTRACT

A system for inputting and processing handwritten, multi-character text may comprise a handwriting recognition subsystem, a word completion subsystem, and an audio feedback system. The handwriting recognition system may be configured to capture a series of handwritten characters formed by a user and to convert the handwritten characters into a set of candidate partial text strings. The word completion subsystem may be configured to identify if a candidate partial text string constitutes a word segment and if so, generate one or both of (i) at least one clarifying word and (ii) at least one clarifying phrase that includes the clarifying word. The word segment may be an arbitrary string and not correspond to a valid complete word in a language associated with the system. The audio feedback subsystem may be configured to produce an audio representation of the word segment(s), the clarifying word(s), and the clarifying phrase(s).

18 Claims, 7 Drawing Sheets

(51) Int. Cl.
*G10L 13/08* (2013.01)
*G06F 40/205* (2020.01)
*G06F 40/289* (2020.01)

(56) References Cited

U.S. PATENT DOCUMENTS

| | | | | |
|---|---|---|---|---|
| 6,632,094 | B1* | 10/2003 | Falcon | G09B 17/006 434/167 |
| 7,634,463 | B1* | 12/2009 | Katragadda | G06Q 10/10 707/999.102 |
| 8,082,152 | B2* | 12/2011 | Francioli | G09B 21/00 704/260 |
| 8,712,931 | B1 | 4/2014 | Wahlen | |
| 2003/0187651 | A1* | 10/2003 | Imatake | G10L 13/06 704/269 |
| 2004/0140956 | A1* | 7/2004 | Kushler | G06F 3/0236 345/168 |
| 2007/0252680 | A1* | 11/2007 | Pfeiffer | H04H 20/55 340/425.5 |
| 2008/0072143 | A1* | 3/2008 | Assadollahi | G06F 3/04892 715/261 |
| 2008/0195388 | A1 | 8/2008 | Bower et al. | |
| 2009/0295737 | A1* | 12/2009 | Goldsmith | G06F 40/274 345/169 |
| 2011/0050589 | A1* | 3/2011 | Yan | G01C 21/3664 345/173 |
| 2012/0063684 | A1* | 3/2012 | Denoue | G06K 9/2072 382/175 |
| 2012/0259615 | A1* | 10/2012 | Morin | G06F 40/274 704/9 |
| 2013/0063357 | A1* | 3/2013 | Lee | G06F 3/0233 345/168 |
| 2015/0035765 | A1* | 2/2015 | Hirabayashi | G06K 9/00436 345/173 |
| 2015/0043824 | A1 | 2/2015 | Akhavan Fomani et al. | |
| 2015/0193141 | A1* | 7/2015 | Goldsmith | G06K 9/222 345/173 |
| 2015/0293602 | A1 | 10/2015 | Kay et al. | |
| 2015/0294145 | A1* | 10/2015 | Bouaziz | G06F 3/0237 382/186 |
| 2016/0321238 | A1* | 11/2016 | Kurita | G06F 3/04886 |
| 2017/0242581 | A1* | 8/2017 | Couelier | G06F 40/274 |
| 2018/0129897 | A1* | 5/2018 | Hinckley | G06K 9/00416 |
| 2020/0065370 | A1* | 2/2020 | Mannby | G06F 40/205 |

* cited by examiner

MULTI-CHARACTER TEXT INPUT SYSTEM WITH AUDIO FEEDBACK AND WORD COMPLETION

BACKGROUND

Conventional text input systems, which may be used in mobile systems such as automobiles, typically allow a user to enter text character-by-character (e.g., by tapping a keyboard or single character handwriting recognition) or possibly word-by-word (e.g., by tracing on a keyboard). Feedback to the user of how the system interpreted the input is important, since the user input is sometimes difficult to interpret, often inexact and sometimes ambiguous. In an automobile, audio feedback generally is preferred over visual feedback so that a driver's eyes remain on the road while the user provides input and confirms the results.

One issue to be addressed is how to communicate non-word text strings to the end user in the most understandable and effective way. While handling individual character input is relatively easy, working with groups of characters all at once can be problematic, especially when the group of characters is an arbitrary character string and not a valid word (i.e., not a word that is a recognized member of a language associated with the text input system). Neither state-of-the-art text to speech (TTS) products nor even humans can pronounce all character combinations understandably without resorting to spelling by reciting individual characters, which is considered ineffective.

SUMMARY

Multi-character input (i.e., submitting multiple characters in a single burst) is faster than single character input. An example is handwriting recognition where a timeout is imposed only once per string rather than once per character. Many text input systems also contain a word completion module. A multi-character input module that allows incomplete words, combined with a word completion module, is quite effective. But those incomplete words are hard to pronounce understandably in audio feedback. State of the art text-to-speech (TTS) systems can guess the pronunciation of an incomplete word reasonably well, although the results are not perfect, and in many cases no perfect pronunciation even exists. Embodiments described herein provide a small amount of extra audio feedback, which clarifies an incomplete word to the user. The described embodiments transfer information that is useful for effective input, namely the best completion candidate.

A multi-character text input system may comprise a handwriting recognition subsystem, a word completion subsystem, and an audio feedback subsystem. The handwriting recognition subsystem may be configured to capture a series of handwritten characters formed by a user, and to convert the handwritten characters into a set of candidate partial text strings. The word completion subsystem may be configured to, for each candidate partial text string of the set of candidate partial text strings, determine if the candidate partial text string constitutes a word segment, and, when the candidate partial text string is determined to constitute the word segment, generate, based on the word segment, one or both of (i) at least one clarifying word and (ii) at least one clarifying phrase that comprises the clarifying word. The audio feedback subsystem may be configured to produce an audio representation of the one or more of the word segment, the at least one clarifying word, and the at least one clarifying phrase.

In an embodiment, the word segment may not correspond to a valid word in a language associated with the handwriting recognition subsystem. The word completion subsystem may utilize at least one contextual information input to generate the one or more of the at least one clarifying word and the at least one clarifying phrase that comprises the clarifying word. The contextual information input may comprise at least one of relational information, field information, location-based information, and time-of-day information, among others.

The audio feedback subsystem may comprise a sound-producing component configured to convey the audio representation to the user. The at least one clarifying word may comprise a list of words based on the word segment. The list of words may be ordered according to a likelihood of correctness. The likelihood of correctness may be determined based on at least one contextual information input.

The clarifying phrase(s) may comprise a conjunctive phrase that associates the word segment with the clarifying word. The conjunctive phrase may be limited to three words or fewer. The audio feedback subsystem may be configured to render the audio representation of the word segment as a discernable pronunciation.

In another aspect, the invention may be a computer-implemented method of receiving and responding to multi-character text input. The method may comprise capturing, by a handwriting recognition subsystem, a series of handwritten characters formed by a user. The method may further comprise, by a processor and a memory with computer code instructions stored thereon, the memory operatively coupled to the processor such that, when executed by the processor, the computer code instructions cause the system to implement converting the handwritten characters into a set of candidate partial text strings. For each candidate partial text string of the set of candidate partial text strings, the method may comprise determining if the candidate partial text string constitutes a word segment, and when the candidate partial text string is determined to constitute the word segment, generating, based on the word segment, one or more of (i) at least one clarifying word and (ii) at least one clarifying phrase that comprises the clarifying word. The method may further comprise producing an audio representation of the one or more of the word segment, the at least one clarifying word, and the at least one clarifying phrase.

The method may further comprise utilizing at least one contextual information input to generate the one or more of at least one clarifying word and at least one clarifying phrase that comprises the clarifying word. The at least one clarifying word may comprise a list of words based on the word segment, and further comprising ordering the list of words according to a likelihood of correctness.

The method may further comprise conveying the audio representation to the user through a sound-producing component. The method may further comprise rendering the audio representation of word segment as a discernable pronunciation.

In another aspect, the invention may be a non-transitory computer-readable medium with computer code instruction stored thereon, the computer code instructions, when executed by a processor, cause an apparatus to convert the handwritten characters into a set of candidate partial text strings. For each candidate partial text string of the set of candidate partial text strings, the executed computer code instructions may further cause the apparatus to determine if the candidate partial text string constitutes a word segment, and when the candidate partial text string is determined to constitute the word segment, generate, based on the word segment, one or more of (i) at least one clarifying word and (ii) at least one clarifying phrase that comprises the clarifying word, and produce an audio representation of the one or more of the word segment, the at least one clarifying word, and the at least one clarifying phrase.

The computer code instructions, when executed by a processor, may further ause an apparatus to utilize at least one contextual information input to generate the word segment, and the one or more of at least one clarifying word and at least one clarifying phrase that comprises the clarifying word.

The computer code instructions, when executed by a processor, may further cause an apparatus to convey the audio representation to the user through a sound-producing component.

The computer code instructions, when executed by a processor, may further cause an apparatus to order the at least one clarifying word as a list of words according to a likelihood of correctness.

The computer code instructions, when executed by a processor, may further cause an apparatus to render the audio representation of the word segment as a discernable pronunciation.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

The described embodiments of the invention operate to receive a partial textual string input into a text input system, where the partial textual string is a beginning portion of a known word. The partial textual string is read out as a single unit, as if the partial textual string were a complete word. The described embodiments then clarify the partial textual string by producing a clarifying phrase, which may contain the clarifying word as a best completion candidate.

Alternative embodiments may apply the partial text string to an end portion of a known word or a middle portion of a known word. For simplicity, example embodiments described in detail below are with reference to the "beginning portion" embodiment.

Figure 1:
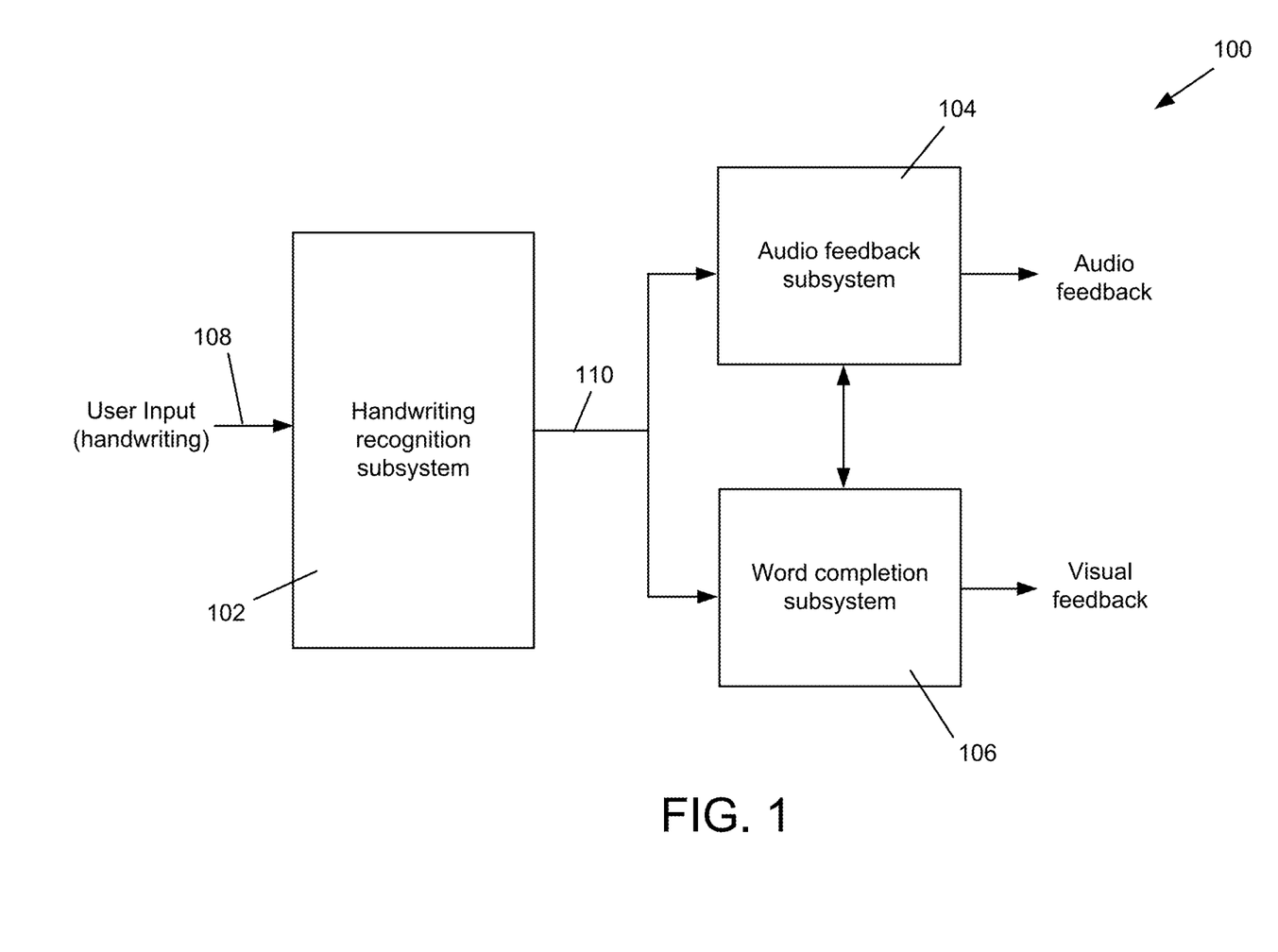
FIG. 1 is a block diagram of an example embodiment of a multi-character text input recognition system with audio feedback and word completion according to the invention.

FIG. 1 illustrates an example embodiment of a multi-character text input recognition system 100 according to the invention. The multi-character text input recognition system comprises a handwriting recognition subsystem 102, an audio feedback subsystem 104, and a word completion subsystem 106. The handwriting recognition subsystem 102 may receive user input 108 in the form of handwritten strokes entered, for example, on a touch-sensitive display screen or a dedicated writing panel.

The handwriting recognition subsystem 102 may convert the handwritten strokes to a textual output (e.g., Unicode), and provide the textual output 110 to the audio feedback subsystem 104 and the word completion subsystem 106. Implementations of the handwriting recognition system are well known in the art, and so are not set forth in detail herein.

The audio feedback subsystem 104 may generate an audio representation of the textual output 110, and provide the generated audio representation to the user through a speaker or other sound-producing component (i.e., an electrical-to-audio transducer—not shown).

The word completion subsystem 106 may receive the textual output 110 and generate one or more candidate word predictions (also referred to herein as clarifying words). For each of the clarifying words, the word completion subsystem 106 may also provide a clarifying word phrase, which includes the associated clarifying word. The clarifying word(s) and the clarifying word phrase(s) may be conveyed to the audio feedback system 104, which may present the clarifying word(s) and/or clarifying word phrase(s) to the user as audio feedback through the sound-producing component. The clarifying word(s) and/or the clarifying word phrase(s) may be presented on a display (not shown) as visual feedback, instead of or in addition to the audio feedback.

In some embodiments, the textual output 110 may be in the form of a partial text string. The partial text string may or may not be an actual word. In such cases, the audio feedback subsystem 104 may provide a candidate pronunciation of the partial text string, and the word completion subsystem 106 may generate a clarifying word and/or clarifying word phrase based on the partial text string.

In an example operation, a user may hand write a partial text string (in this example, "hamb") into the handwriting recognition subsystem 102. The handwriting recognition subsystem generates candidate partial text strings based on the handwritten pattern. The candidate partial text string generation of the word completion subsystem 106 may be based on the first candidate partial text string "hamb" (in this example the first candidate is actually the user's intended partial text string) generate a clarifying word phrase of "hamb as in hamburger," and convey the clarifying word phrase to the audio feedback subsystem 104. The audio feedback subsystem 104 may provide an audio representation of the clarifying word phrase to the user. Note that for the partial text string it is kept as a complete word segment, rather than the individual letter components (i.e., "hamb" rather than "h-a-m-b"). In addition to the clarifying word "hamburger," the clarifying phrase in this example also comprises the conjunctive phrase "as in." Although other conjunctive phrasing constructs may be used, the embodiments described herein preferably utilize simple conjunctive phrases (e.g., three words or fewer) to generate clarifying phrases that are short and concise.

The audio feedback module 104 is configured to render unknown partial text strings, which may be the beginning of known text strings, with a discernible (i.e., reasonably understandable) pronunciation. The pronunciation does not have to be perfect, however, since the clarifying phrase helps the user to understand the partial text string. This rendering capability can be fulfilled by state-of-the-art TTS products, such as Nuance Vocalizer product.

The word completion subsystem 106 may utilize known word lists to generate a list of candidate clarifying words. The word completion subsystem 106 may further utilize contextual information to facilitate an intelligent selection and/or ordering of the clarifying words. The contextual information may concern the relationship of the text being entered to the neighboring information (e.g., word(s) to the left and/or to the right of the entered text). This contextual information may be referred to herein as relational information. The contextual information may alternatively concern the nature of the fields in which the text is being entered. For example, a handwritten text input of "cla" entered into a search field of a navigation system may result in "Clarksville" as a clarifying word, while the same handwritten text input of "cla" entered into a search field of a music player may result in "classical" as a clarifying word. This contextual information may be referred to herein as field information. It should be understood that the contextual information inputs described above are examples only, and are not intended to be limiting. Alternative embodiments may utilize other contextual information inputs known in the art, instead of or in addition to the examples described herein.

For other embodiments, the contextual information may concern observations beyond the local data entry. By way of example, for the handwritten input "hamb" described above, the word completion subsystem 106 may utilize location-based information to ascertain that the user is currently traveling in Germany, so that the city of Hamburg could be a more likely choice than other clarifying words. Alternatively, the word completion subsystem 106 may utilize time-of-day information to ascertain that the current time is a mealtime (e.g., lunch, dinner), so that the food item hamburger could be a more likely choice than other clarifying words. Alternative embodiments may use other contextual information to intelligently select and/or order the candidate clarifying words.

Figure 2A:
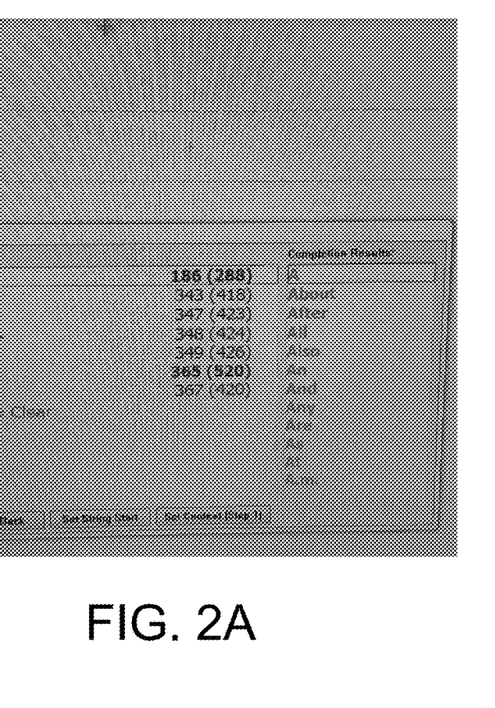
FIGS. 2A through 2F are screen shots that depict example operation of an embodiment of the invention.
Figure 2B:
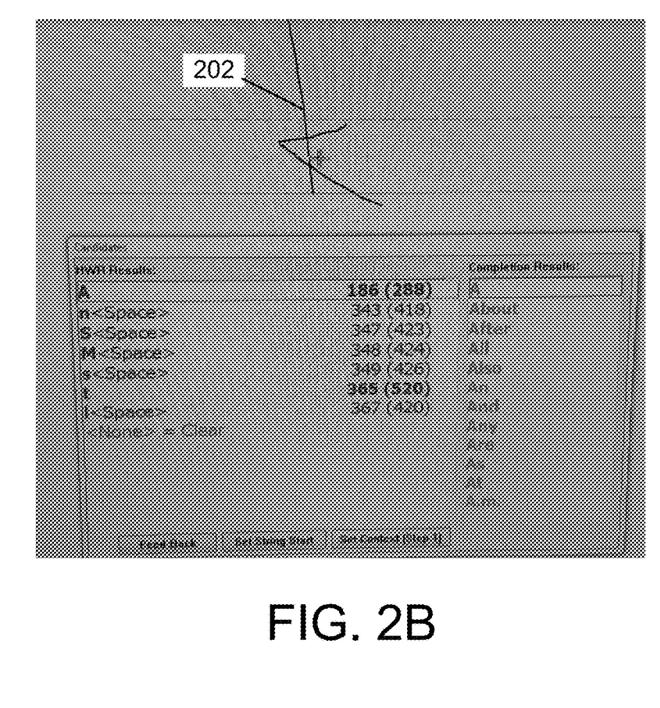
Figure 2C:
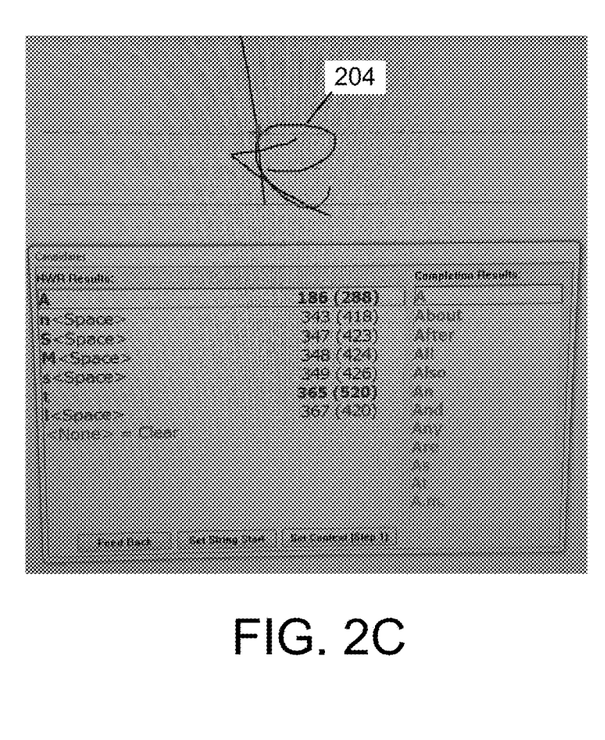
Figure 2D:
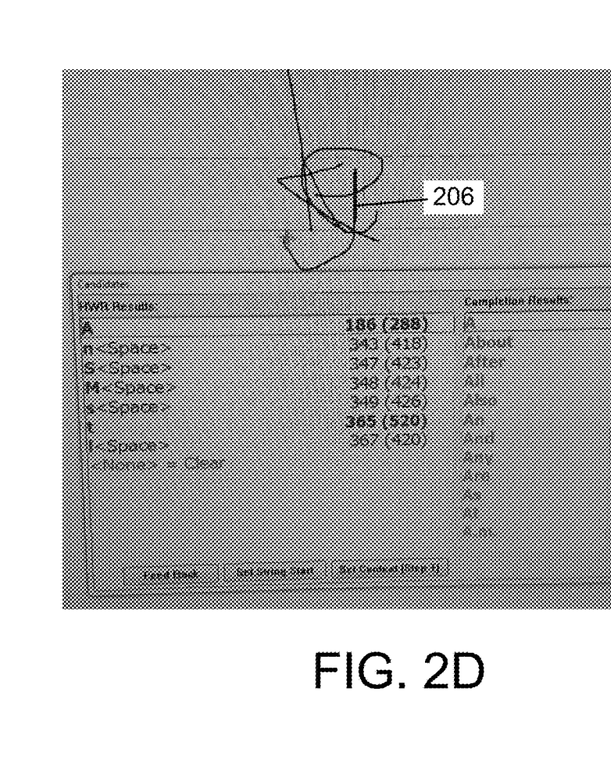
Figure 2E:
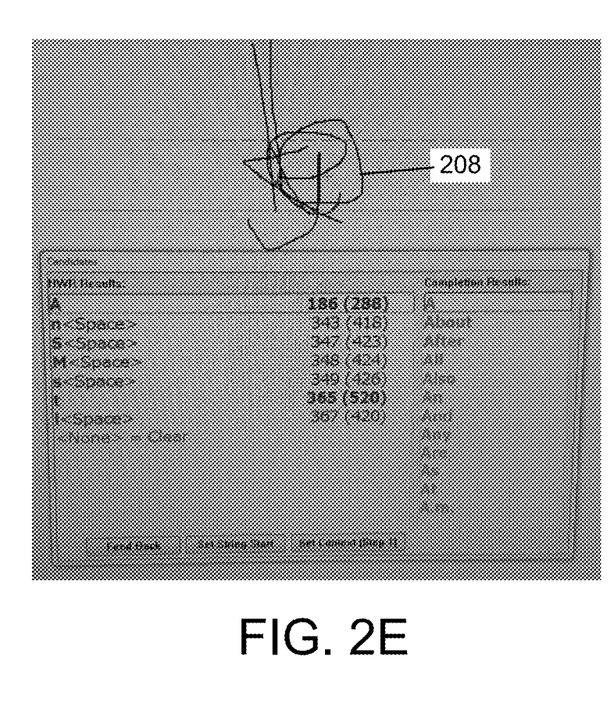
Figure 2F:
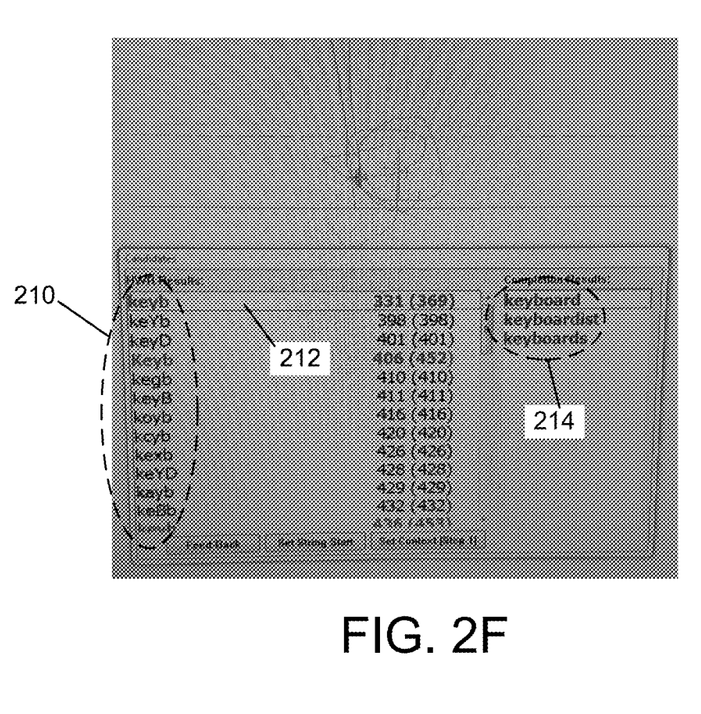

FIGS. 2A through 2F depict example operation of an embodiment of the invention. In this example, the partial text string "keyb" is sequentially entered into the system 100 by a user by way of hand-written strokes. FIG. 2A illustrates a blank writing input panel, prior to the user entering handwritten information. FIG. 2B illustrates a first letter "k" 202 written, FIG. 2C shows a second letter "e" 204 written, FIG. 2D shows a third letter "y" 206 written, and FIG. 2E shows a fourth letter "b" 208 written. FIG. 2E shows a set of candidate partial text strings 210, generated by the handwriting recognition subsystem 106 and displayed for the user, with the most likely candidate being keyb 212. A set of clarifying words 214 are presented to the user, with "keyboard" being shown as the most likely clarifying word. The audio feedback subsystem 104 provides audio feedback as "keyb as in keyboard." The example embodiment may pronounce the partial text segment as keeb rather than spelling out the individual letters "k-e-y-b."

Figure 3A:
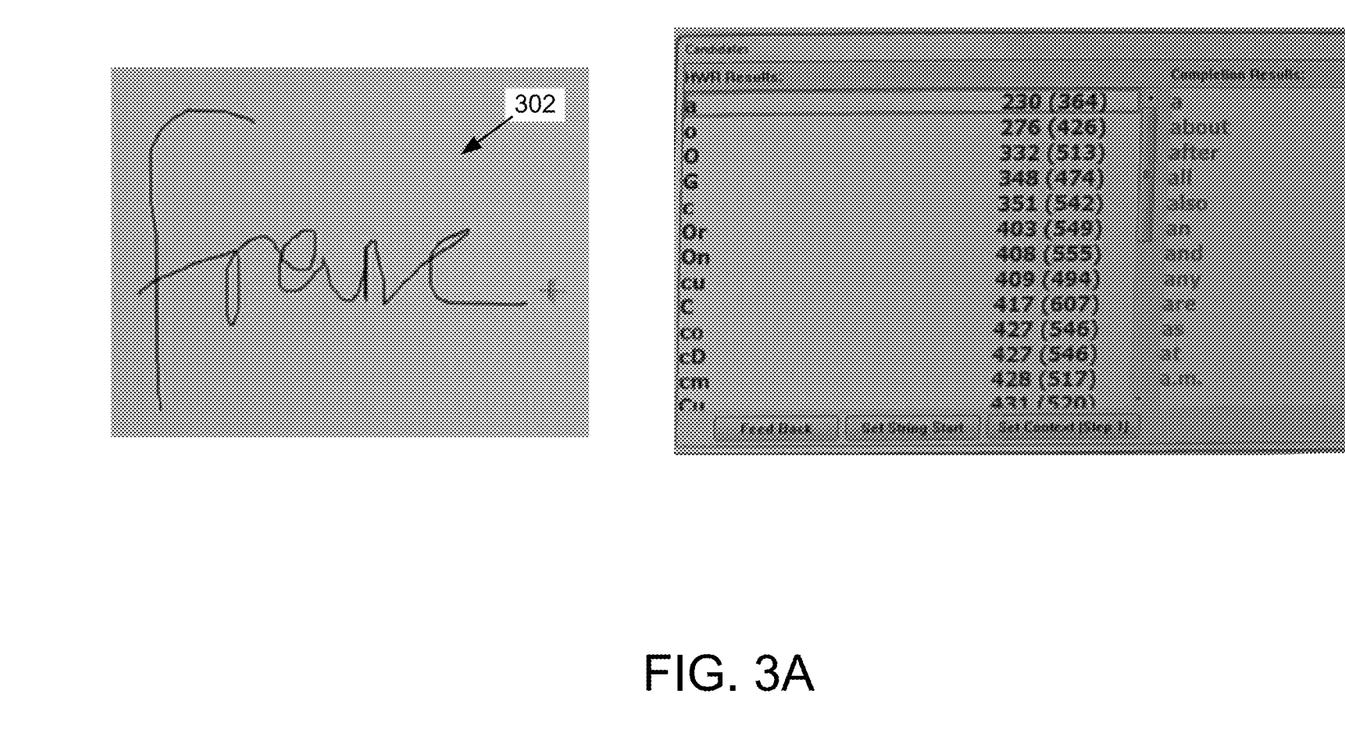
FIGS. 3A and 3B are screen shots that depict another example operation of an embodiment of the invention.
Figure 3B:
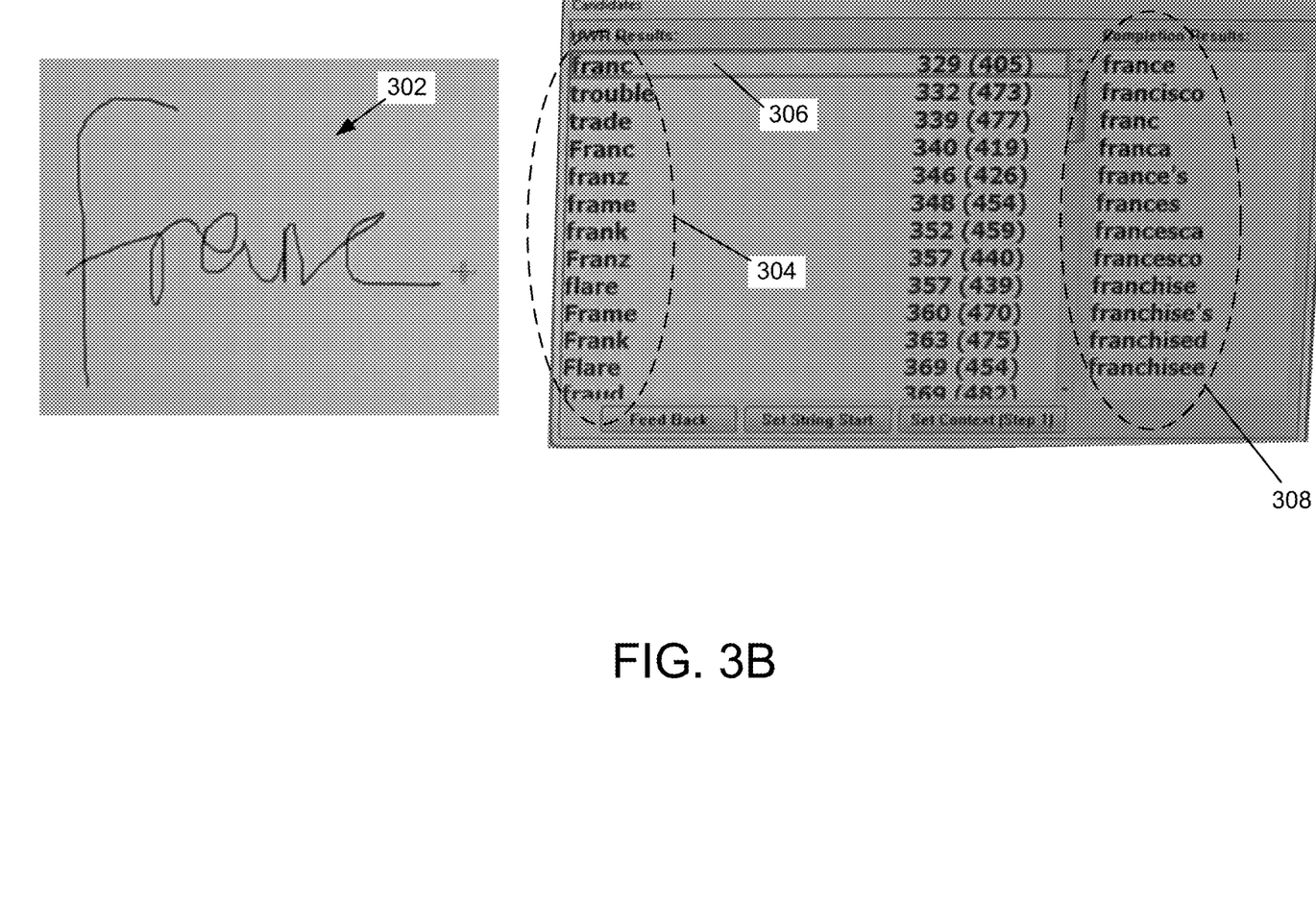

FIGS. 3A and 3B depict another example operation of an embodiment of the invention. In this example, a user submits a handwritten input of "franc" 302, as shown in FIG. 3A. As shown in FIG. 3B, the handwriting recognition subsystem 106 generates and presents a set of candidate partial text strings 304, with a most likely candidate being franc 306. A set of clarifying words 308 are presented to the user, with "france" being shown as the most likely clarifying word. The audio feedback subsystem 104 may provide the clarifying phrase "franc as in france." An alternative embodiment may provide an augmented clarifying phrase, such as "franc as in france, Francisco, the word franc, and others," thereby notifying the user of other candidate clarifying words that may suitably represent the handwritten input.

Figure 4:
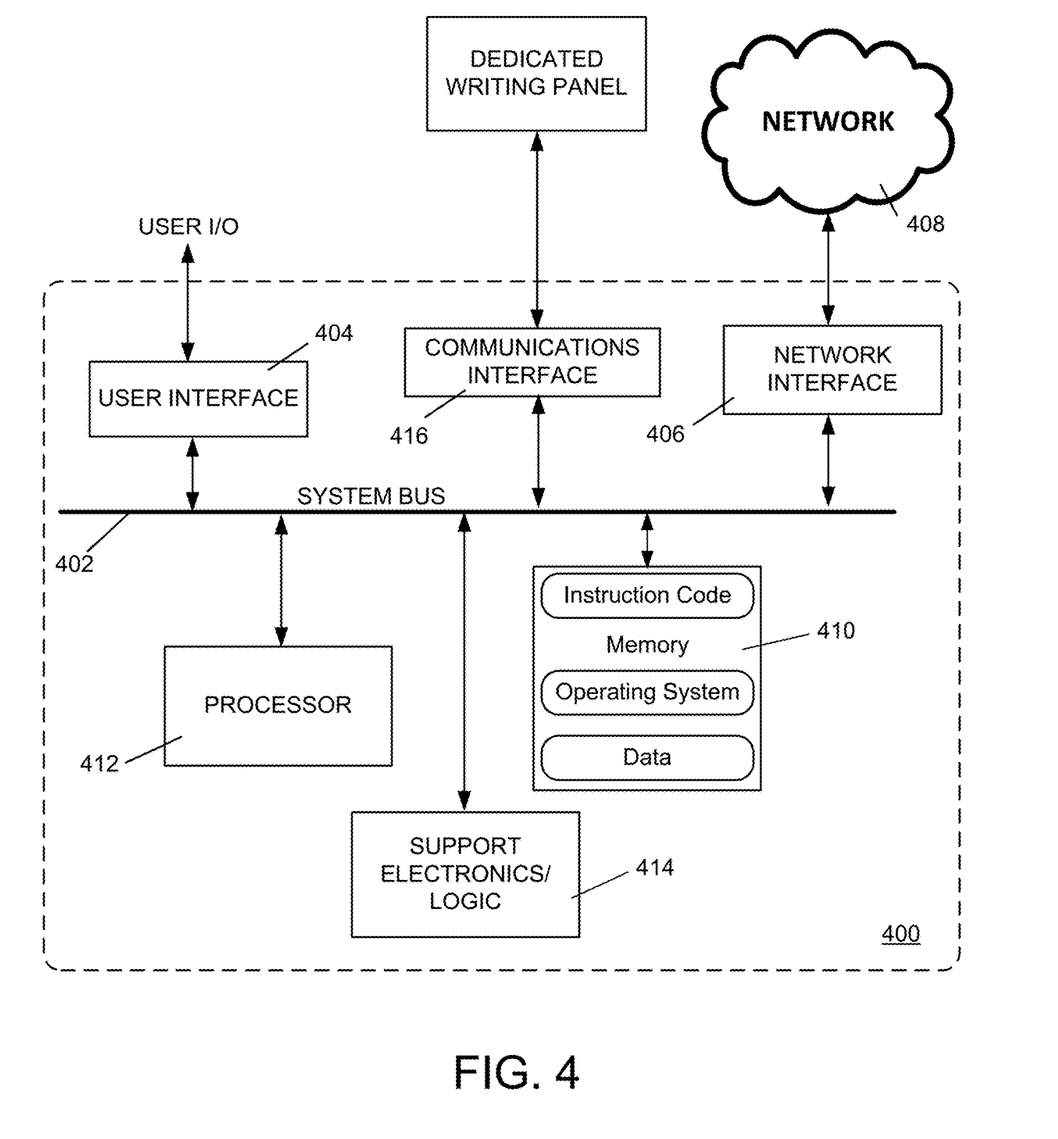
FIG. 4 is a diagram of an example internal structure of a processing system that may be used to implement one or more of the embodiments herein.

FIG. 4 is a diagram of an example internal structure of a processing system 400 that may be used to implement one or more of the embodiments herein. Each processing system 400 contains a system bus 402, where a bus is a set of hardware lines used for data transfer among the components of a computer or processing system. The system bus 402 is essentially a shared conduit that connects different components of a processing system (e.g., processor, disk storage, memory, input/output ports, network ports, etc.) that enables the transfer of information between the components.

Attached to the system bus 402 is a user I/O device interface 404 for connecting various input and output devices (e.g., keyboard, mouse, displays, printers, speakers, etc.) to the processing system 400. A network interface 406 allows the computer to connect to various other devices attached to a network 408. Memory 410 provides volatile and non-volatile storage for information such as computer software instructions used to implement one or more of the embodiments of the present invention described herein, for data generated internally and for data received from sources external to the processing system 400.

A central processor unit 412 is also attached to the system bus 402 and provides for the execution of computer instructions stored in memory 410. The system may also include support electronics/logic 414, and a communications interface 416. The communications interface may comprise an interface to the dedicated writing panel described with reference to the handwriting recognition system 102 shown in FIG. 1.

In one embodiment, the information stored in memory 410 may comprise a computer program product, such that the memory 410 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While example embodiments have been particularly shown and described, it will be understood by those skilled in the art that various changes in form and details may be made therein without departing from the scope of the embodiments encompassed by the appended claims.

What is claimed is:

1. A multi-character text input system, said multi-character text input system comprising a handwriting-recognition subsystem, a word-completion subsystem, and an audio-feedback subsystem,
   wherein said handwriting-recognition subsystem is configured to capture a series of handwritten characters that are formed by a user and to convert said handwritten characters into a set of candidate partial text strings,
   wherein the word-completion subsystem is configured to determine that said candidate partial text string constitutes a word segment that does not correspond to a valid word in a language associated with the handwriting recognition subsystem and to generate, based on the word segment, a clarifying phrase that is a clarifying conjunctive phrase that comprises a clarifying word and the word segment,
   wherein the audio-feedback subsystem is configured to produce an audio representation of the clarifying phrase.

2. The system of claim 1, wherein the word-completion subsystem utilizes at least one contextual-information input to generate the element.

3. The system of claim 2, wherein the contextual-information input comprises field information.

4. The system of claim 2, wherein the contextual-information input comprises relational information.

5. The system of claim 2, wherein the contextual-information input comprises time-of-day information.

6. The system of claim 2, wherein the contextual-information input comprises location-based information.

7. The system of claim 1, wherein the audio-feedback subsystem comprises a sound-producing component configured to convey the audio representation to the user.

8. The system of claim 1, wherein the at least one clarifying words are constituents of a list of words based on the word segment, the list of words having been ordered according to a likelihood of correctness.

9. The system of claim 8, wherein the likelihood of correctness is determined based on at least one contextual: information input.

10. The system of claim 1, wherein the clarifying phrase associates the word segment with a clarifying word.

11. The system of claim 10, wherein the conjunctive phrase is three words or fewer.

12. The system of claim 1, wherein the audio-feedback subsystem is configured to render the audio representation of the word segment as a discernable pronunciation.

13. The system of claim 1, wherein said word-completion subsystem is configured to generate, based on said word segment, a pair of clarifying words.

14. A computer-implemented method of receiving and responding to multi-character text input, said method comprising:
   causing a handwriting-recognition subsystem to carry out capturing a series of handwritten characters formed by a user and
   causing a processor that is operatively coupled with a memory having computer-code instructions stored thereon to execute the steps of
   converting the handwritten characters into a set of candidate partial text strings,
   for each candidate partial text string of the set of candidate partial text strings, determining that the candidate partial text string constitutes a word segment that does not correspond to a valid word in a language associated with the handwriting recognition subsystem,
   generating, based on the word segment, at least one clarifying phrase that is a clarifying conjunctive phrase and comprises the clarifying word and the word segment, and
   producing an audio representation of the clarifying phrase.

15. The computer-implemented method of claim 14, further comprising utilizing at least one contextual information input to generate the element.

16. The computer-implemented method of claim 14, further comprising conveying the audio representation to the user through a sound-producing component.

17. The computer-implemented method of claim 14, further comprising rendering the audio representation of word segment as a discernable pronunciation.

18. A non-transitory computer-readable medium with computer code instruction stored thereon, wherein the computer code instructions, when executed by a processor, cause an apparatus to convert handwritten characters written by a user into a set of candidate partial text strings, for each candidate partial text string of the set of candidate partial text strings, determine that the candidate partial text string constitutes a word segment that does not correspond to a valid word in a language associated with the handwriting recognition subsystem, generate, based on the word segment, a clarifying phrase that is a clarifying conjunctive phrase and includes a clarifying word and the word segment and, produce an audio representation of the clarifying phrase.

* * * * *